United States Patent
Nguyen et al.

(10) Patent No.: US 9,548,923 B2
(45) Date of Patent: *Jan. 17, 2017

(54) SYSTEM AND METHOD FOR UTILIZING A UNIQUE IDENTIFIER WHILE REGISTERING A DEVICE IN A NETWORK

(71) Applicant: Dell Products, LP, Round Rock, TX (US)

(72) Inventors: Cuong T. Nguyen, Austin, TX (US); Charles Terrence Perusse, Pflugerville, TX (US); Rabah Hamdi, Spring, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/607,822

(22) Filed: Jan. 28, 2015

(65) Prior Publication Data

US 2015/0139243 A1    May 21, 2015

Related U.S. Application Data

(63) Continuation of application No. 13/739,466, filed on Jan. 11, 2013, now Pat. No. 8,953,617.

(51) Int. Cl.
*H04L 12/28* (2006.01)
*H04L 12/741* (2013.01)
*H04L 29/12* (2006.01)
*H04L 12/931* (2013.01)

(52) U.S. Cl.
CPC ............. *H04L 45/745* (2013.01); *H04L 45/54* (2013.01); *H04L 49/00* (2013.01); *H04L 61/103* (2013.01); *H04L 61/6009* (2013.01)

(58) Field of Classification Search
CPC combination set(s) only.
See application file for complete search history.

(56) References Cited

U.S. PATENT DOCUMENTS

| | | | |
|---|---|---|---|
| 5,978,854 A | 11/1999 | Fujimori et al. | |
| 6,542,510 B1 | 4/2003 | Fujimori et al. | |
| 7,519,167 B2 | 4/2009 | Jriej et al. | |
| 8,315,264 B2 * | 11/2012 | Moser | H04L 45/02 370/400 |
| 9,231,866 B2 * | 1/2016 | Sundaram | H04L 45/745 |
| 2012/0087249 A1 | 4/2012 | Tran et al. | |
| 2012/0106553 A1 | 5/2012 | Melman et al. | |
| 2012/0282894 A1 | 11/2012 | Heutschi et al. | |
| 2014/0198788 A1 | 7/2014 | Nguyen et al. | |

* cited by examiner

*Primary Examiner* — Frank Duong
(74) *Attorney, Agent, or Firm* — Larson Newman, LLP

(57) ABSTRACT

An information handling system includes a server having a management system module. The management system module broadcasts an address resolution protocol request including a unique identifier in the information handling system. The management system module also receives multiple address resolution protocol responses to the address resolution protocol request. Each of the multiple address resolution protocol responses includes a different media access control address associated with the unique identifier. The management system module also creates a unique identifier table correlating each of the media access control addresses with the unique identifier.

20 Claims, 6 Drawing Sheets

SYSTEM AND METHOD FOR UTILIZING A UNIQUE IDENTIFIER WHILE REGISTERING A DEVICE IN A NETWORK

CROSS REFERENCE TO RELATED APPLICATIONS

This application is a continuation of U.S. patent application Ser. No. 13/739,466 entitled "System and Method for an Utilizing a Unique Identifier while Registering a Device in a Network," filed on Jan. 11, 2013, the disclosure of which is hereby expressly incorporated by reference in its entirety.

FIELD OF THE DISCLOSURE

This disclosure generally relates to information handling systems, and more particularly relates to a system and method for utilizing a unique identifier while registering a device in a network.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

When a new device is added to a network, the device can be provisioned with some initial default configurations and can be registered with a management system of the network so that the device can be managed by the management system. The new device can connect to network via a switch, which in turn can have a table identify an Internet Protocol address and media access control address for each network interface card connected to the switch. The switch can then utilize this table to route data to different devices in the network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
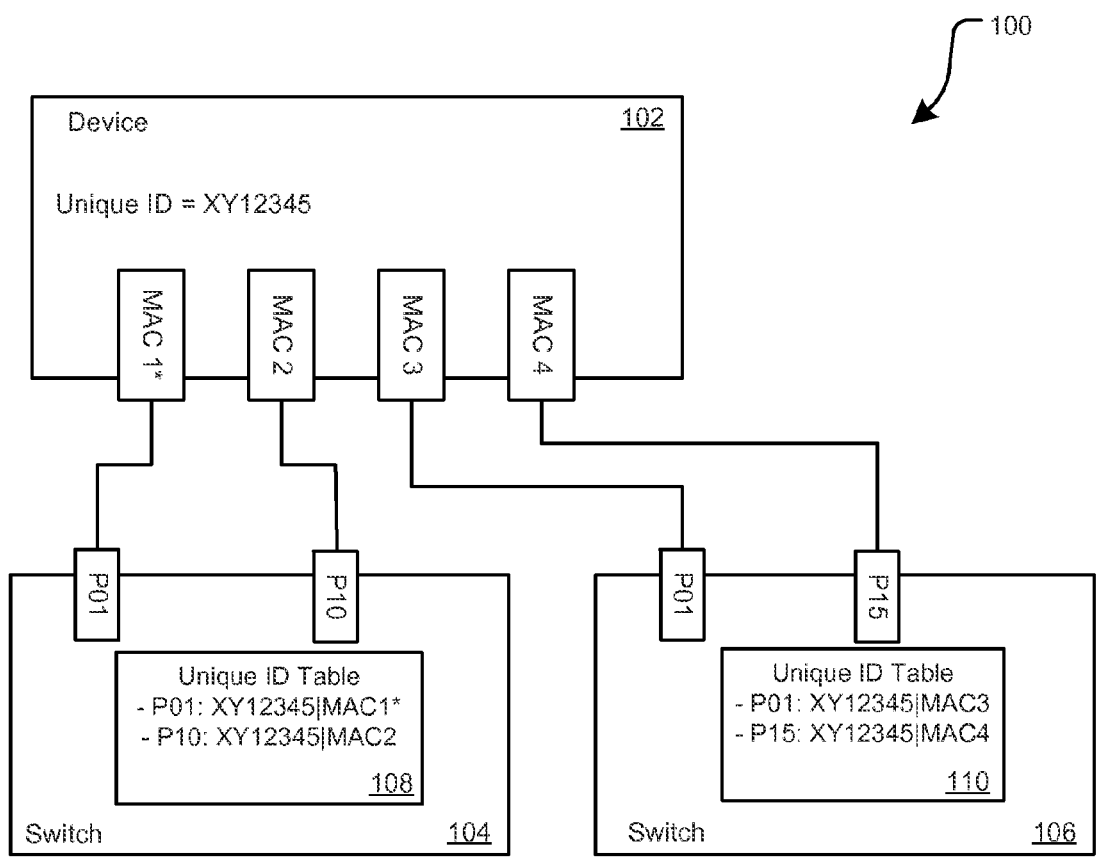
FIG. 1 is a block diagram of an embodiment of an information handling system.

FIG. 1 illustrates an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Information handling system 100 includes a device 102, which is in communication with switches 104 and 106. The device 102 can include multiple network interface cards (NICs), which can each have a different media access control (MAC) address to make them individually addressable. For example, the device 102 can include four NICs each with a different MAC address, such as MAC 1, MAC 2, MAC 3, and MAC 4. The device 102 can be connected to the switch 104 via first and second NICs having respective MAC addresses of MAC 1 and MAC 2. Similarly, the device 102 can be connected to the switch 106 via third and fourth NICs having respective MAC addresses of MAC 3 and MAC 4. Each of the NICs in the device 102 can be connected to a different port of the switches 104 or 106, such as port 01 and port 10 of switch 104, and port 01 and port 15 of switch 106.

When the device 102 is first powered on after being connected to the information handling system 100, the device 102 can transmit a unique identifier (ID) of the device and the specific MAC addresses for each of the NICs in the device to the switches 104 and 106. The unique ID can be any type of label that is unique to the device 102, such as a service tag assigned to the device by the manufacturer of the device. The unique ID can include multiple alpha-numeric characters for uniquely identifying the device 102. For example, the unique ID for device 102 can be XY12345 as shown in FIG. 1.

The switch 104 can receive the unique ID and the associated MAC addresses on different ports of the switch, and can then create a unique ID table 108 to identify the unique ID/MAC address connected to every port of the switch. For example, the switch 104 can create an entry "P01: XY12345|MAC1*" in the unique ID table 108 to identify that a NIC within the device 102 having a unique ID XY12345 has a MAC address of MAC1 and is connected to port P01 of the switch. Similarly, the switch 104 can create an entry "P10: XY12345|MAC2" in the unique ID table 108 to identify that a NIC within the device 102 having a unique ID XY12345 has a MAC address of MAC2 and is connected to port P10 of the switch.

The switch 106 can also receive the unique ID and the associated MAC address on different ports of the switch, and can then create a unique ID table 110 to identify the unique ID/MAC address connected to every port of the switch. For example, the switch 106 can create an entry "P01: XY12345|MAC3" in the unique ID table 110 to identify that a NIC within the device 102 having a unique ID XY12345 has a MAC address of MAC3 and is connected to port P01 of the switch. Similarly, the switch 106 can create an entry "P15: XY12345|MAC4" in the unique ID table 110 to identify that a NIC within the device 102 having a unique ID XY12345 has a MAC address of MAC4 and is connected to port P15 of the switch.

The switches 104 and 106 can utilize the respective unique ID tables 108 and 110 to identify network connections. The unique ID for the device 102 in addition to the MAC address of the NIC of the device can be utilized to identify that the NICs are part of the same device. In addition, the device 102 can identify a management NIC to the switches 104 and 106, and the switches can identify the management NIC in the unique ID table 108 or 110. For example, the NIC having a MAC address of MAC1 can be the management NIC for the device 102, such that the switch 104 can identify the entry P01:12345|MAC1* with the "*" to identify that the NIC connected to the port P01 is the management NIC for the device 102. The switches 104 and 106 can utilize the unique ID tables 108 and 110 to register the device 102 with a management system module 208 of the information handling system 100 as discussed below with respect to FIGS. 2-4.

Figure 2:
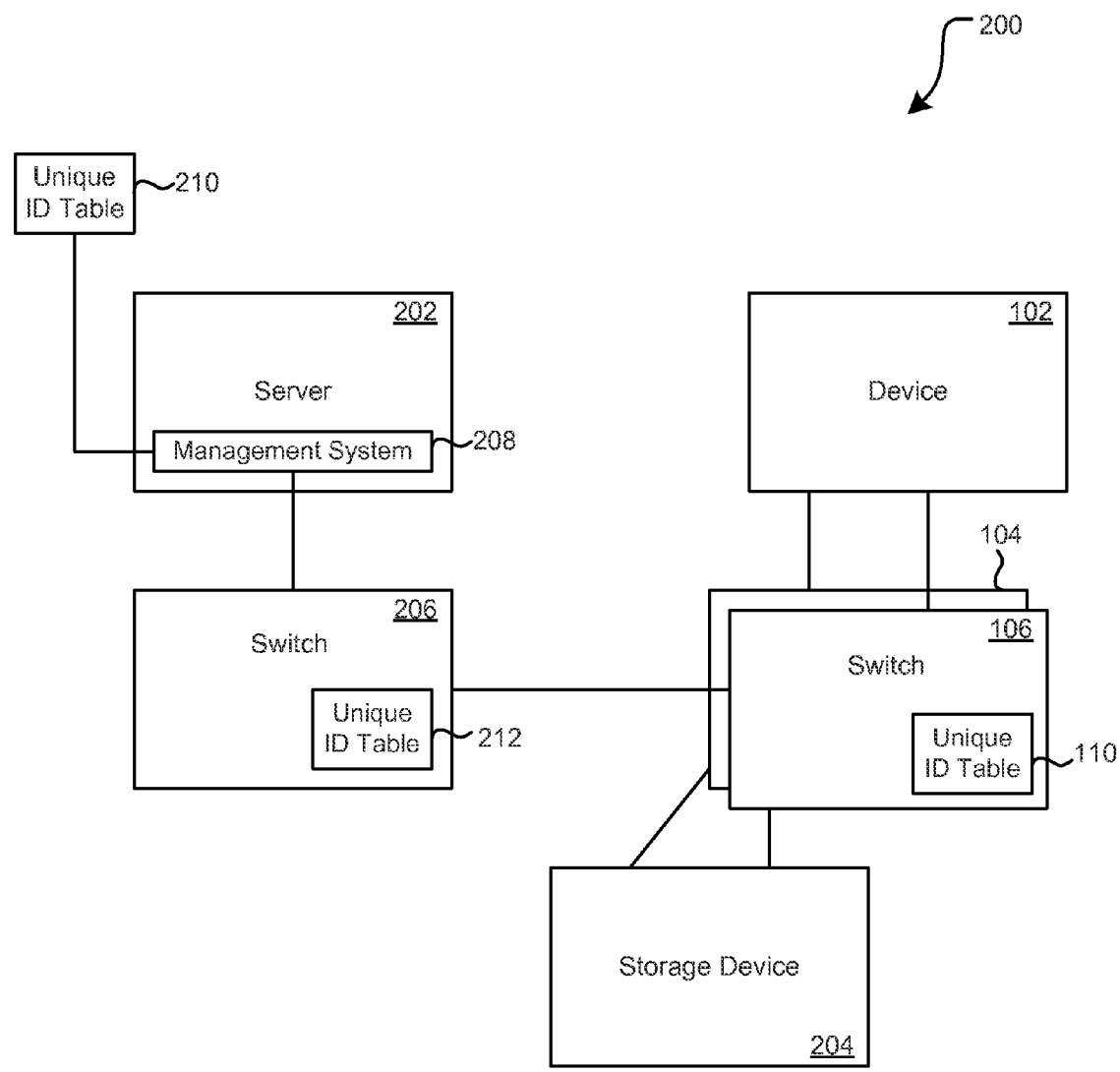
FIG. 2 is a block diagram of another embodiment of the information handling system.

FIG. 2 shows another embodiment of the information handling system 100 including a server 202, a storage device 204, a switch 206, device 102, and switches 104 and 106. The server 202 can be a management server for the information handling system 100, and can include a management system module 208 that can be in communication with a unique ID table 210. Each of the switches 104, 106, and 206 can include a respective unique ID table, such as the unique ID table 108 in switch 104, the unique ID table 110 in switch 106, and the unique ID table 212 in switch 206.

The server 202 can utilize the unique IDs stored in the unique ID tables to be aware of and/or discover devices connected to the information handling system 100. The server 202 can then map how each of devices, such as the device 102 and the storage device 204, are connected to the information handling system 100 by receiving information available in the network switches 104, 106, and 206 without communicating with a management NIC of each of the devices. Therefore, the server 202 may possibly verify proper installation of the device 102 and the storage device 204 in the information handling system 100 even before the management NIC in each of devices is fully online based on the devices communicating the unique ID and MAC addresses to the switches 104 and 106 when the devices are first powered on.

The unique ID is assigned to the entire device 102 or the storage device 204, and not just to an individual NIC within the device. Therefore, the unique ID can allow the server 202 to request all associated network resources, such as the NICs, for the device 102 or the storage device 204 from the switches 104, 106, and 206 having the unique ID tables 108, 110, and 212. For example, if the device 102 did not have a unique ID, or if a unique ID query cannot be performed, the management system module 208 would make multiple queries to discover how each of the four NICs of the device 102 are connected to the switches 104 and 106. The multiple queries would be an individual Internet Protocol (IP) query for each IP address of the different NICs in the device 102. However, if a unique ID query is performed, a single unique ID query can return all the NICs within the device 102 having the specific unique ID.

Prior to the device 102 and the storage device 204 being connected to the information handling system 100, a user can login to a web portal for the management system module 208 and can configure create an inventory list of devices and identify how the devices can be connected within the information handling system. The devices 102 and 204 can then be shipped to a customer site along with instructions for physically connecting the devices to the switches 104 and 106. A user at the customer site can connect the device 102 and the storage device 204 to the switches 104 and 106 according to the instructions received with the devices, and can power on the devices. At this point, if the inventory list of devices, the identification of how the device 102 and storage device 204 are to be connected, and associated unique IDs for all the devices is in a machine readable form, the management system module 208 can discover the devices in the information handling system 100 based only on the unique IDs and verify that the devices are properly connected without having to actually communicate with and establish management role with the devices. Thus, the use of unique ID can allow the installation process to be simplified and improve user experience during an initial turn-on process for the device 102 and the storage device 204.

The registering and/or discovery of the device 102 and the storage device 204 can be substantially the same. Therefore, the registering of a device with be described only with respect to the device 102 for simplicity. The device 102 can be connected to both the switch 104 and 106 within the information handling system 100. When the device 102 connects to the information handling system 100, the device can transmit a Link Layer Discovery Protocol (LLDP) packet 300 (shown in FIG. 3) including the unique ID for the device to both switches 104 and 106. The device 102 can send the LLDP packet 300 on each link established from the different NICs of the device. For example, the device 102 can register its unique ID on both switches 104 and 106 via the four NICs shown in FIG. 1.

Figure 3:
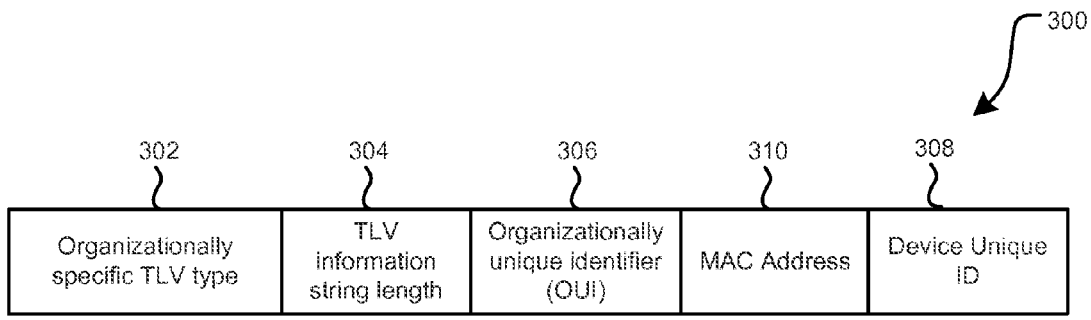
FIG. 3 is a diagram of an exemplary portion of a link layer discover protocol packet utilized within the information handling system.

FIG. 3 shows a time to live (TTL) format portion of a payload in the LLDP packet 300, which includes an organizational specific portion 302, a TTL information string length portion 304, an organizationally unique ID 306, a unique ID portion 308, and a MAC address portion 310. The organizational specific portion 302 can allow the device 102 to send vendor specific information about the device in the LLDP payload 300. The TTL information string length portion 304 can identify the length of the LLDP packet 300. The organizationally unique ID 306 can include an identifier for a NIC of the device 102, such as the IP address of the NIC. The unique ID portion 308 can include the unique ID for the device 102. The MAC address portion 310 can include the MAC address associated with the NIC sending the LLDP packet 300. The MAC address portion 310 can also indicate whether the MAC address is associated with the management NIC, which is the NIC associated with the management of the device 102. If the device has a dedicated management NIC for out-of-band management then only LLDP packet 300 on the dedicated port may register the management MAC along with the unique ID. If in-band management is supported then any port may register the management MAC address for the unique ID of the device 102.

Referring back to FIG. 2, when each of the switches 104 and 106 receives the LLDP packet 300, the switch can associate the unique ID, embedded in the unique ID portion 308, in the unique table 110 with the switch port on which the LLDP packet was received. The switches 104 and 106 can then create the unique ID tables 108 and 110 as described above with respect to FIG. 1. The switch 104 can also store an indication of the MAC address that is associated with a management NIC in the unique ID table 108, as shown in FIG. 1.

When the switches 104 and 106 have created the unique ID tables 108 and 110, the management system module 208 can transmit an address resolution protocol (ARP) packet to each of the switches 104, 106, and 206 to discover the MAC addresses associated with the unique ID of the device 102. The management system module 208 can modify an ARP packet to find MAC addresses and map the MAC addresses to a unique ID. Typical ARP packets have been used for mapping a MAC address to a given IP address. The management system module 208 would use ARP packet to send out a query to find the MAC address for a given IP address. Then a device that knows about the requested IP address would respond with a unicast packet back to the management system module 208 with the associated MAC address. However, the modified ARP request 400 (shown in FIG. 4) can be utilized to resolve a unique ID to the MAC addresses of the device 102 instead. Also, the switches 104 and 106 store the unique ID of the device 102, such that the switches can also respond to the ARP request 400 on behalf of the device. Normally only a single response would be received at the management system module 400 for an ARP request, but a single unique ID may be associated with multiple MAC addresses, such that each switch having the unique ID in its unique ID table can provide an ARP response for each entry of the unique ID in the unique ID table.

Figure 4:
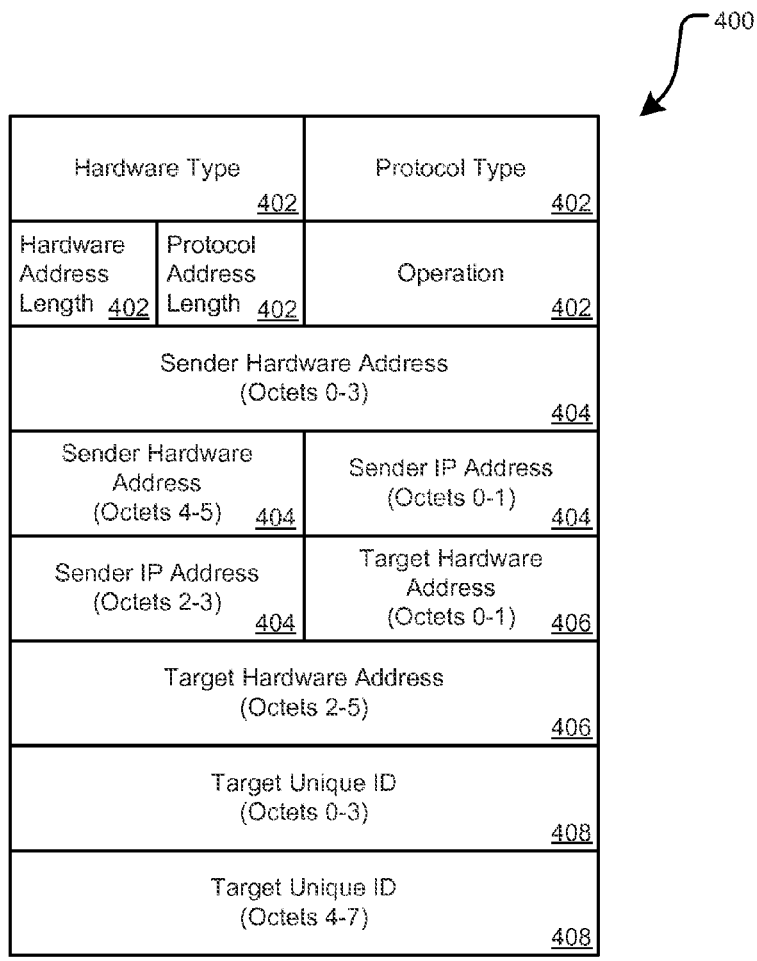
FIG. 4 is a diagram of an exemplary address resolution protocol packet utilized within the information handling system.

FIG. 4 shows the ARP request 400 including a hardware and protocol portion 402, a sender portion 404, a target hardware address portion 406, and a target unique ID portion 408. The hardware and protocol portion 402 can include multiple fields that include information associated with the ARP request 400. For example, the hardware and protocol portion 402 can include hardware field, a protocol type field, a hardware address length field, a protocol address length field, and an operation field. The sender portion 404 can include multiple fields associated with the sender hardware address and the sender IP address. The fields in the sender portion 404 can be utilized, by the device that receives the ARP request 400, to determine the address to send an ARP response. The target hardware address 406 can include multiple fields in the ARP request 400, and the target hardware address can remain empty until the ARP response, which can then include a MAC address of the device 102. The target unique ID portion 408 can include the unique ID of the target device. However, in a previous ARP request this portion of the ARP request would have a target IP address for a particular NIC of the device.

Referring back to FIG. 2, the management system module 208 can send the ARP request 400 with the unique ID for the device 102 to be located instead of an IP address associated with a NIC in the device. The management system module 208 can broadcast the ARP request 400 to all of the switches 104, 106, and 206, which in turn can provide an ARP response if the unique ID table for the switch includes an entry with the unique ID. A response packet can have the target hardware address portion 406 filled with the MAC address associated with the unique ID for the device 102. For example, the switches 104 and 106 can provide the ARP response with the MAC address associated with the unique ID of the device 102. There may be multiple responses for a single ARP request since the device 102 can have multiple NICs that each have a different MAC address. In an embodiment, the target unique ID portion 408 can include more bytes than the unique ID for the device 102, such that the last byte may be used in the response to indicate if the MAC address in the response refers to a management MAC address for the device.

For example, if the MAC address is associated with the management NIC the last byte of the unique ID portion 408 in the response can be set to a first value, such as 0xFF. Otherwise, if the MAC address being returned is not associated with a management NIC, the last byte can be set to a second value, such as 0x00. The management system module 208 can receive multiple responses to identify all MAC addresses associated with the given unique ID. The management system module 208 can then store all the MAC addresses with the corresponding unique ID in the unique ID table 210. In one embodiment, the ARP response can also include information identifying the switches 104 and 106 that respond to the ARP request.

The management system module 208 can then utilize the unique ID table 210 to determine all MAC addresses associated with a unique ID. The management system module 208 can send Layer 2 ping to each of the MAC addresses associated with the unique ID for the device 102. The switches 104 and 106 can then send a response to the Layer 2 ping for each individual MAC address related to the unique ID of the device 102. If the management system module 208 receives an unreachable response for any MAC address, the management system module can send another ARP request 400 for the unique ID of the device 102 to refresh the unique ID table 210. In an embodiment, the ARP request can be automatically triggered in response to the unreachable response.

Once the management system module 208 has verified the unique ID of the device 102 with each of the MAC addresses associated with the device listed in the unique ID table 210 via the Layer 2 ping, the management system module can utilize Layer 2 protocols to communicate with the management NIC of the device directly without requiring Layer 3 protocol addresses. Because a unique ID may be associated with multiple MAC addresses, the management system module 108 can select any MAC address that was previously designated as the management MAC address to communicate with the management NIC on the device 102.

The switches 104, 106, and 206 can provide different features described above via a user interface and/or an application programming interface. For example, the switches 104, 106, and 206 can return all learned unique IDs to the management system module 208, and can return all MAC addresses associated with a unique ID to the management system module. The switches 104, 106, and 206 can also provide a command to ping a unique ID, and can provide a trace route method for all a unique IDs by simply doing a Layer 2 trace route for each MAC address. The switches 104, 106, and 206 can also associate performance data previously tied to individual ports and MAC addresses to the associated unique ID of an entire device 102, and can include associated unique IDs into event notifications or log records where physical ports and/or MAC addresses were previously recorded. If the NICs are not identified by the unique ID of the device 102 any dynamic change to a MAC address of NICs would cause all of the performance data for the device to be lost.

Figure 5:
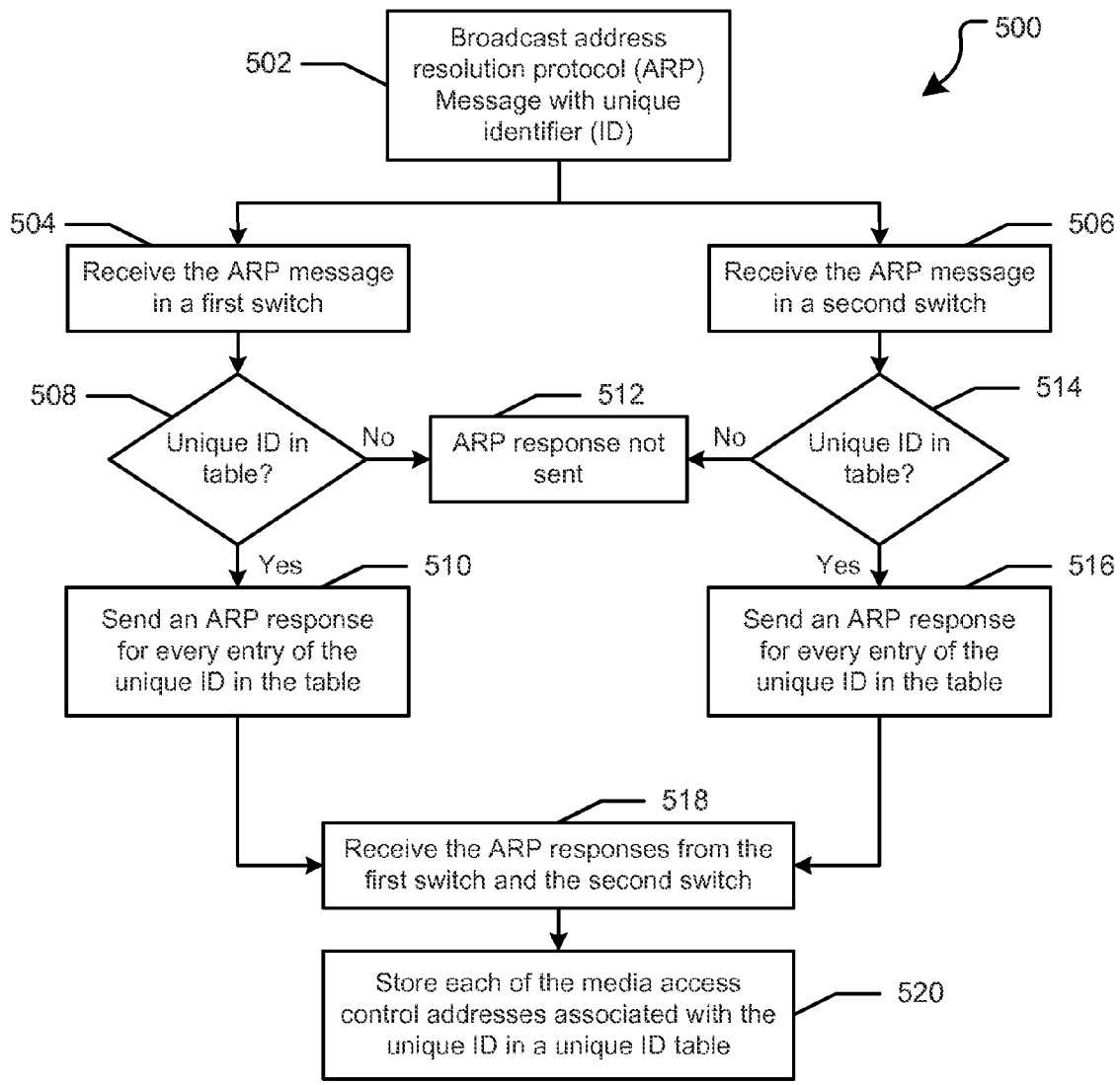
FIG. 5 is a flow diagram of a method for registering a device with a management system module in the information handling system.

FIG. 5 shows a flow diagram of a method 500 for discovering unique IDs of device connected in an information handling system. At block 502, an ARP message including a unique ID is broadcast from a management system module, The ARP message can be used to request MAC addresses associated with the unique ID included in the ARP message. The ARP message is received at a first switch at block 504. At block 506, the ARP message is received at a second switch. At block 508, the first switch makes a determination of whether the unique ID in the ARP message is stored within a unique ID table of the switch. If the unique ID is located within the unique ID table, the first switch sends a separate ARP response for every entry of the unique ID in the unique ID table at block 510. Each ARP response can include a different MAC address associated with the unique ID. Each MAC address can be associated with a different NIC of a device connected to the first and second switches. If the unique ID is not located within the unique ID table, the first switch does not send an ARP response at block 512.

At block 514, the second switch makes a determination of whether the unique ID in the ARP message is stored within a unique ID table of the switch. If the unique ID is located within the unique ID table, the second switch sends a separate ARP response for every entry of the unique ID in the unique ID table at block 516. Each ARP response can include a different MAC address associated with the unique ID. In an embodiment, an ARP response can indicate whether a MAC address is associated with a management NIC of a device having the unique ID. If the unique ID is not located within the unique ID table, the second switch does not send an ARP response at block 512. At block 518, the management system module receives all of the ARP responses from the first and second switches. At block 520, the management system module stores each of the MAC addresses associated with the unique ID in a unique ID table of the management system module.

Figure 6:
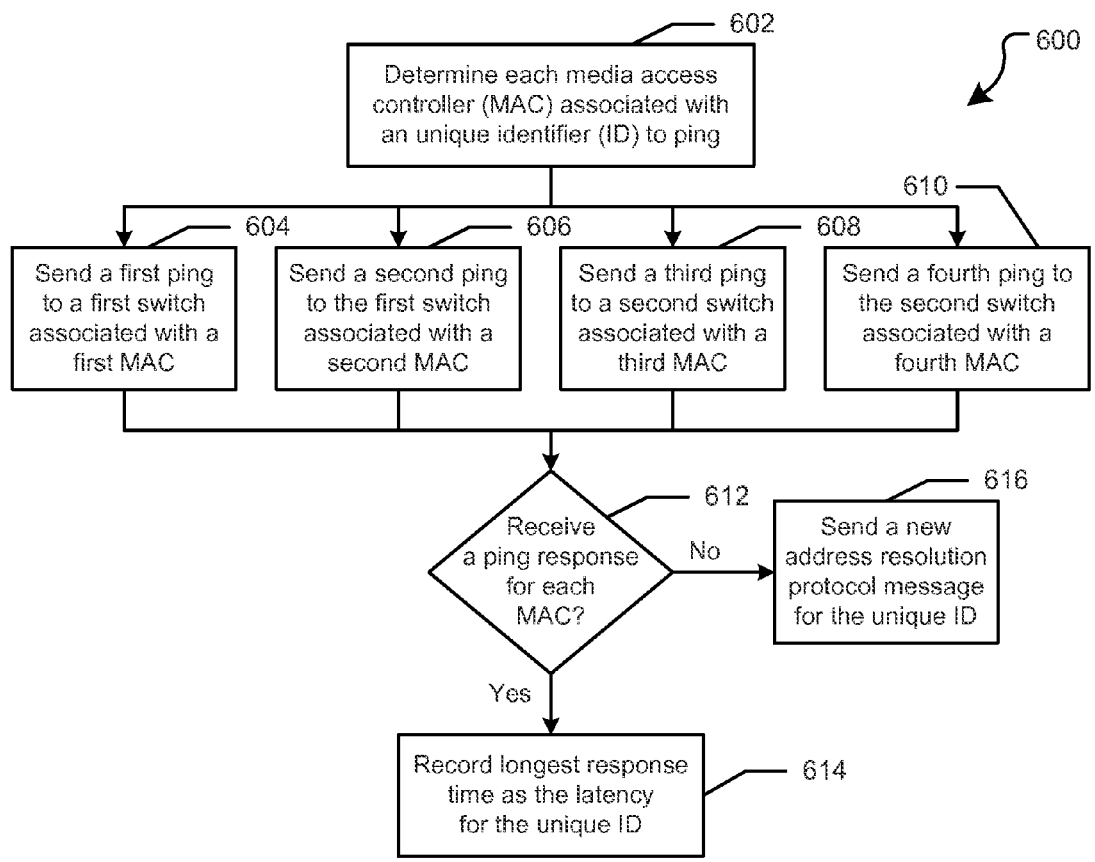
FIG. 6 is a flow diagram of a method for discovering additional information about the device in the information handling system.

FIG. 6 shows a flow diagram of a method 600 for determining information about a device connected to an information handling system. At block 602, a management system module determines each MAC address associated with a unique ID. The management system module can utilize a unique ID table to make the MAC address determination. At block 604, a first ping is sent to a first switch associated with a first MAC address. In an embodiment, the unique ID table can identify the first switch as being connected to the first MAC address. At block 606, a second ping is sent to the first switch associated with a second MAC address.

At block 608, a third ping is sent to a second switch associated with a third MAC Address. A fourth ping is sent to the second switch associated with a fourth MAC address at block 610. At block 612, a determination is made whether a ping response is received for each MAC address of the unique ID. If a ping response is received for each MAC address, a longest response time between the pings is recorded as a latency for the unique ID at block 614. If a ping response is not received for at least one of the MAC addresses, a new ARP message including the unique ID is sent at block 616. The new ARP can be utilized to update a unique ID table for the management system module.

Figure 7:
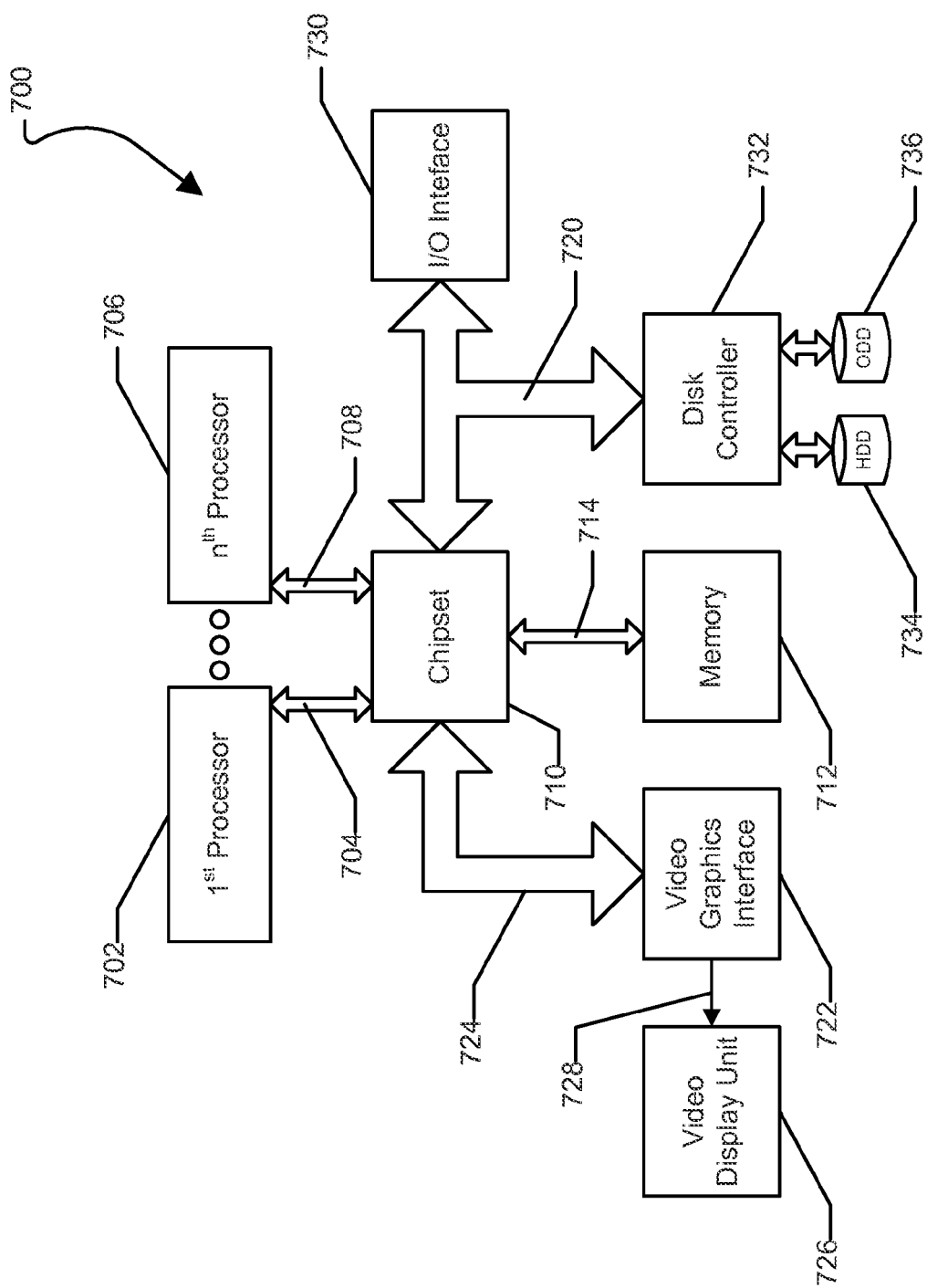
FIG. 7 is a block diagram of a general information handling system.

As shown in FIG. 7, the information handling system 700 can include a first physical processor 702 coupled to a first host bus 704 and can further include additional processors generally designated as $n^{th}$ physical processor 706 coupled to a second host bus 708. The first physical processor 702 can be coupled to a chipset 710 via the first host bus 704. Further, the $n^{th}$ physical processor 706 can be coupled to the chipset 710 via the second host bus 708. The chipset 710 can support multiple processors and can allow for simultaneous processing of multiple processors and support the exchange of information within information handling system 700 during multiple processing operations.

According to one aspect, the chipset 710 can be referred to as a memory hub or a memory controller. For example, the chipset 710 can include an Accelerated Hub Architecture (AHA) that uses a dedicated bus to transfer data between first physical processor 702 and the $n^{th}$ physical processor 706. For example, the chipset 710, including an AHA enabled-chipset, can include a memory controller hub and an input/output (I/O) controller hub. As a memory controller hub, the chipset 710 can function to provide access to first physical processor 702 using first bus 704 and $n^{th}$ physical processor 706 using the second host bus 708. The chipset 710 can also provide a memory interface for accessing memory 712 using a memory bus 714. In a particular embodiment, the buses 704, 708, and 714 can be individual buses or part of the same bus. The chipset 710 can also provide bus control and can handle transfers between the buses 704, 708, and 714.

According to another aspect, the chipset 710 can be generally considered an application specific chipset that provides connectivity to various buses, and integrates other system functions. For example, the chipset 710 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 710. The chipset 710 can also be packaged as an application specific integrated circuit (ASIC).

The information handling system 700 can also include a video graphics interface 722 that can be coupled to the chipset 710 using a third host bus 724. In one form, the video graphics interface 722 can be an Accelerated Graphics Port (AGP) interface to display content within a video display unit 726. Other graphics interfaces may also be used. The video graphics interface 722 can provide a video display output 728 to the video display unit 726. The video display unit 726 can include one or more types of video displays such as a flat panel display (FPD) or other type of display device.

The information handling system 700 can also include an I/O interface 730 that can be connected via an I/O bus 720 to the chipset 710. The I/O interface 730 and I/O bus 720 can include industry standard buses or proprietary buses and respective interfaces or controllers. For example, the I/O bus 720 can also include a Peripheral Component Interconnect (PCI) bus or a high speed PCI-Express bus. In one embodiment, a PCI bus can be operated at approximately 76 MHz and a PCI-Express bus can be operated at more than one speed, such as 2.5 GHz and 4 GHz. PCI buses and PCI-Express buses can be provided to comply with industry standards for connecting and communicating between various PCI-enabled hardware devices. Other buses can also be provided in association with, or independent of, the I/O bus 720 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 710 can be a chipset employing a Northbridge/Southbridge chipset configuration (not illustrated). For example, a Northbridge portion of the chipset 710 can communicate with the first physical processor 702 and can control interaction with the memory 712, the I/O bus 720 that can be operable as a PCI bus, and activities for the video graphics interface 722. The Northbridge portion can also communicate with the first physical processor 702 using first bus 704 and the second bus 708 coupled to the $n^{th}$ physical processor 706. The chipset 710 can also include a Southbridge portion (not illustrated) of the chipset 710 and can handle I/O functions of the chipset 710. The Southbridge portion can manage the basic forms of I/O such as Universal Serial Bus (USB), serial I/O, audio outputs, Integrated Drive Electronics (IDE), and ISA I/O for the information handling system 700.

The information handling system 700 can further include a disk controller 732 coupled to the I/O bus 720, and connecting one or more internal disk drives such as a hard disk drive (HDD) 734 and an optical disk drive (ODD) 736 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 710, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    receiving, at a switch, a unique identifier of a device;
    receiving a media access control address for a network interface card in the device; and
    creating, in the switch, a unique identifier table correlating the media access control address to the unique identifier of the device.

2. The method of claim 1 further comprising:
    correlating, via the unique identifier table, each of a plurality of ports in the switch to a different media access control address and unique identifier pair.

3. The method of claim 1 further comprising:
    receiving, at the switch, an indication that one of the different media access control addresses is associated with a management network interface card in the device.

4. The method of claim 1 further comprising:
    receiving an address resolution protocol request from a management system module; and
    sending a different address resolution protocol response for each entry of the unique identifier within the unique identifier table of the device.

5. The method of claim 4 wherein each address resolution protocol response includes a different media access control address associated with the unique identifier of the device.

6. The method of claim 1 further comprising:
    receiving a ping associated with one of the media access control addresses; and
    sending a response based on the one of the media access control addresses being located within the unique identifier table.

7. The method of claim 1 wherein the unique identifier of the device indicates that the different media access control addresses are all associated with the device.

8. An information handling system comprising:
    a server including a management system module, the management system module configured to broadcast an address resolution protocol request including a unique identifier in the information handling system, to receive an address resolution protocol response to the address resolution protocol request, and to create a unique identifier table correlating a media access control address in the address resolution protocol response with the unique identifier.

9. The information handling system of claim 8 wherein the management system module is further configured to receive an indication that the media access control address is associated with a management network interface card in the device.

10. The information handling system of claim 8 wherein the management system module is configured to send a ping associated with the media access control address, and to receive a response based on the one of the media access control addresses being located within the unique identifier table of a switch.

11. The information handling system of claim 8 wherein the unique identifier of the device indicates that the media access control address is associated with the device.

12. A method comprising:
    determining, by a management system module, a plurality of media access control addresses associated with a unique identifier, the media access control addresses including first and second media access control addresses;
    providing a first ping to a first switch associated with the first media access control address;
    providing a second ping to a second switch associated with the second media access control address;

receiving separate address resolution protocol responses from the first and second switches in response to the first and second pings; and storing each of the media access control addresses associated with the unique identifier in a unique identifier table of the management system module.

13. The method of claim 12 further comprising:

receiving the first ping in the first switch;

determining, by the first switch, whether the unique identifier is stored within a unique identifier table of the first switch; and if the unique identifier is located within the unique identifier table, sending, by the first switch, separate address resolution protocol responses for every entry of the unique identifier in the unique identifier table, otherwise not sending address resolution protocol responses from the first switch.

14. The method of claim 12 further comprising:

receiving the second ping in the second switch;

determining, by the second switch, whether the unique identifier is stored within a unique identifier table of the second switch; and if the unique identifier is located within the unique identifier table, sending, by the second switch, separate address resolution protocol responses for every entry of the unique identifier in the unique identifier table, otherwise, not sending address resolution protocol responses from the second switch.

15. The method of claim 12 further comprising:

correlating a media access control address in the address resolution protocol response with the unique identifier prior to storing each of the media access control addresses in the separate address resolution protocol responses in the unique identifier table of the management system module.

16. The method of claim 14 wherein each separate address resolution protocol response includes a different media access control address associated with the unique identifier.

17. The method of claim 12 further comprising:

sending a ping for each of the media access control addresses in the unique identifier table of the management system module; and determining a latency for a communication with the unique identifier associated with each of the media access control addresses based on a response time for each of the ping of the media access control addresses.

18. The method of claim 12 further comprising:

sending a ping for each of the media access control addresses in the unique identifier table of the management system module;

sending a new address resolution protocol request in response to not receiving a response to the ping for each of the media access control addresses in the unique identifier table of the management system module; and correlating a media access control address in the address resolution protocol response with the unique identifier.

19. The method of claim 12 wherein each media access control address is associated with a different network interface of a device having the unique identifier.

20. The method of claim 12 wherein one of the separate address resolution protocol responses indicates that a particular media access control address is associated with a management network interface of a device having the unique identifier.

* * * * *